United States Patent
Perfetto et al.

(10) Patent No.: US 10,533,507 B2
(45) Date of Patent: Jan. 14, 2020

(54) SYSTEMS AND METHODS FOR CONTROLLING AIR-FUEL RATIO IN DEDICATED EGR ENGINE

(71) Applicant: Cummins Inc., Columbus, IN (US)

(72) Inventors: Anthony Kyle Perfetto, Columbus, IN (US); Samuel C. Geckler, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/011,873

(22) Filed: Jun. 19, 2018

(65) Prior Publication Data

US 2019/0063349 A1 Feb. 28, 2019

Related U.S. Application Data

(60) Provisional application No. 62/549,216, filed on Aug. 23, 2017.

(51) Int. Cl.
| | |
|---|---|
| *F02D 41/06* | (2006.01) |
| *F02D 41/00* | (2006.01) |
| *F02M 26/43* | (2016.01) |
| *F02D 21/08* | (2006.01) |
| *F02D 41/38* | (2006.01) |
| *F02D 41/04* | (2006.01) |
| *F02D 41/12* | (2006.01) |

(52) U.S. Cl.
CPC ......... *F02D 41/0052* (2013.01); *F02D 21/08* (2013.01); *F02D 41/008* (2013.01); *F02D 41/0072* (2013.01); *F02D 41/0082* (2013.01); *F02D 41/38* (2013.01); *F02M 26/43* (2016.02); *F02D 41/045* (2013.01); *F02D 41/12* (2013.01); *F02D 2041/0075* (2013.01); *F02D 2041/389* (2013.01)

(58) Field of Classification Search
CPC ............... F02D 41/0052; F02D 41/008; F02D 41/0072; F02D 41/0082; F02D 41/38; F02D 41/12; F02D 41/045; F02D 21/08; F02D 2041/0075; F02D 2041/389; F02M 26/43
USPC ........... 123/568.17, 568.19, 568.21; 701/108
See application file for complete search history.

(56) References Cited

U.S. PATENT DOCUMENTS

| | | | |
|---|---|---|---|
| 8,291,891 B2 | 10/2012 | Alger, II et al. | |
| 8,893,687 B2 * | 11/2014 | Gingrich | F02D 41/0065 123/315 |
| 9,334,826 B2 | 5/2016 | Wooldridge et al. | |
| 9,534,567 B2 | 1/2017 | Ulrey et al. | |
| 9,581,114 B2 * | 2/2017 | Hilditch | F02D 41/0052 |
| 9,828,955 B2 * | 11/2017 | Hilditch | F02D 41/0052 |
| 10,041,448 B2 * | 8/2018 | Glugla | F02B 47/08 |
| 2016/0230712 A1 * | 8/2016 | Akinyemi | F02M 26/43 |

(Continued)

FOREIGN PATENT DOCUMENTS

| | | |
|---|---|---|
| WO | 2014005127 | 1/2014 |
| WO | 2015066671 | 5/2015 |

*Primary Examiner* — Hai H Huynh
(74) *Attorney, Agent, or Firm* — Taft Stettinius & Hollister LLP

(57) ABSTRACT

Systems, apparatus, and methods are disclosed that include a divided exhaust engine with at least one primary exhaust gas recirculation (EGR) cylinder and a plurality of non-primary EGR cylinders. The systems, apparatus and methods control the fueling to the at least one primary EGR cylinder in response to EGR fraction reduction conditions.

20 Claims, 4 Drawing Sheets

(56) References Cited

U.S. PATENT DOCUMENTS

2016/0237928 A1    8/2016  Lana et al.
2019/0040809 A1*  2/2019  Kolhouse .............. F02D 41/029

* cited by examiner

US 10,533,507 B2

SYSTEMS AND METHODS FOR CONTROLLING AIR-FUEL RATIO IN DEDICATED EGR ENGINE

BACKGROUND

Engines operating with one or more cylinders as dedicated exhaust gas recirculation (EGR) cylinders can provide the entire EGR flow for the engine. The EGR flow can be provided to the intake manifold that feeds all the engine cylinders, including the dedicated EGR cylinder(s). The dedicated EGR cylinder(s) are typically run rich of a stoichiometric air-fuel ratio to provide reformed fuel products to the charge flow that feeds the engine cylinders. The reformed fuel products can enhance the flame speed and prevent the engine from knocking, allowing the engine to operate more efficiently.

However, during certain transient conditions and engine cranking, the EGR flow that is included in the charge flow to the engine cylinders can be significantly reduced or even result no EGR flow. For example, during engine cranking there is no EGR until combustion starts and the exhaust gas produced by the dedicated EGR cylinder(s) flows to the intake manifold. In another example, during accelerator tip-out and/or motoring conditions, the engine pumps fresh air through all the cylinders with no combustion, filling the intake manifold with fresh air. During a subsequent accelerator tip-in, the engine is momentarily more knock limited than during steady state operations since there is no EGR in the intake manifold. The spark timing in the engine cylinders is therefore retarded to prevent engine knock. However, this reduces engine efficiency. Therefore, further technological developments are desirable in this area.

SUMMARY

One embodiment is a unique system, method and apparatus that includes a divided exhaust engine and control of an air-fuel ratio in a dedicated or primary EGR cylinder(s), from which exhaust gas is recirculated to all the cylinders of the engine, in response to an EGR flow reduction condition. The EGR flow reduction condition includes, for example, transient conditions and engine cranking events that reduce or terminate the EGR flow or EGR fraction from the dedicated or primary EGR cylinder(s) as compared to steady state conditions. Other embodiments include unique methods, systems, and apparatus to control a richness in fueling one or more primary EGR cylinders of a divided exhaust engine to mitigate engine knock conditions after EGR flow reduction events which occur in response to certain transient and engine cranking events.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
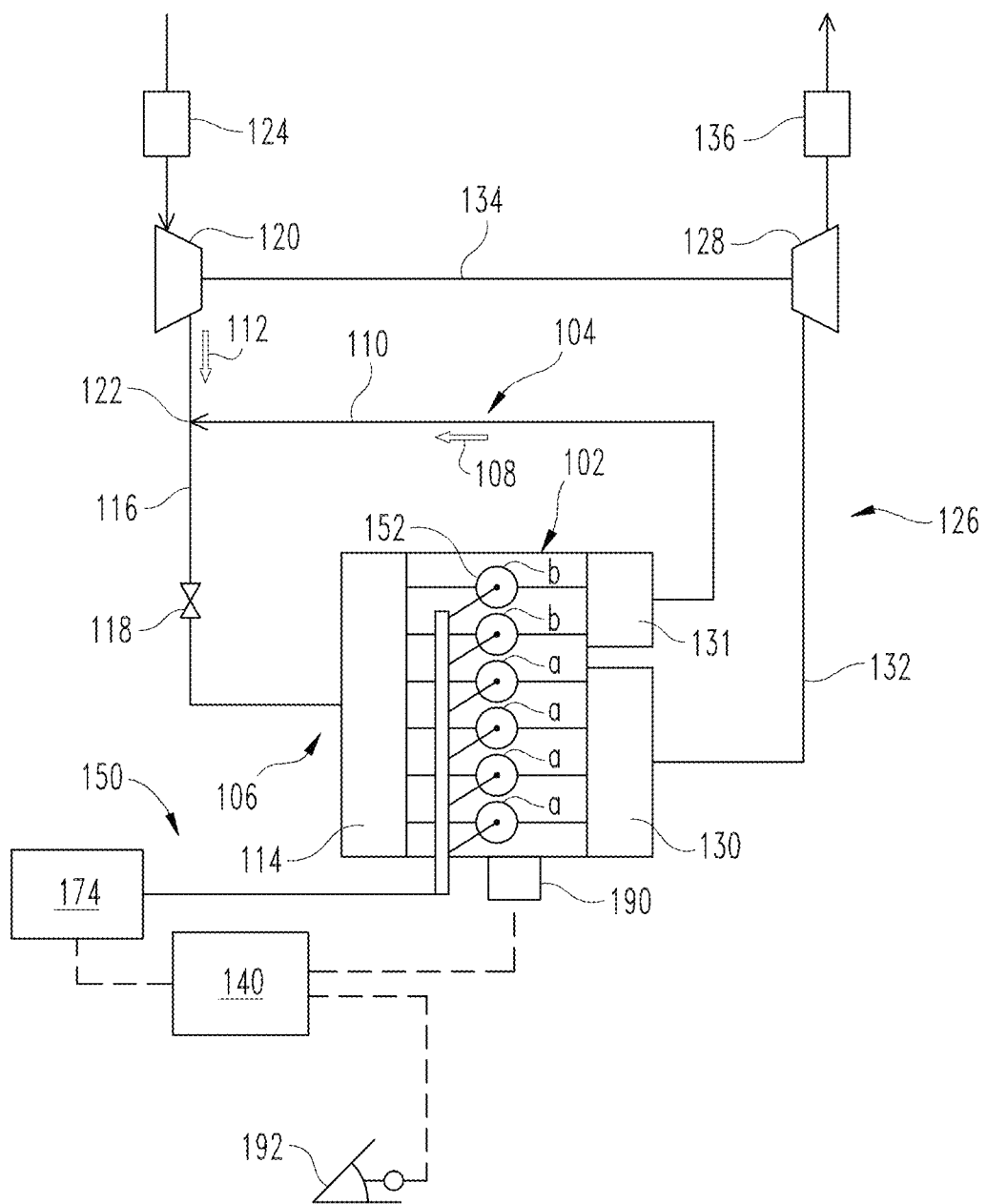
FIG. 1 is a schematic depiction of a system having an engine with primary EGR cylinders and additional non-primary or secondary cylinders that do not contribute to EGR flow at least under certain operating conditions.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102. The engine 102 is an internal combustion engine of any type, and can include a stoichiometric engine, a gasoline engine, and/or a natural gas engine. In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system, for example to reduce $NO_x$ emissions from the engine 102. The engine 102 includes a plurality of cylinders a, b. The number of cylinders a, b may be any number suitable for an engine, and the arrangement of cylinders may be in-line, V, or any suitable arrangement. The system 100 includes an inline 6 cylinder arrangement for illustration purposes only and is not limited to such.

The engine 102 includes primary EGR cylinders b, and other or remaining non-primary EGR cylinders a, that are secondary cylinders or not primary EGR cylinders b. Non-primary EGR cylinders a are completely flow isolated from the EGR system 104 in the illustrated embodiments on the exhaust side of the engine 102. The non-primary EGR cylinders a receive EGR and are flow connected to the primary EGR cylinders b on the intake side of the engine. In other embodiments, non-primary EGR cylinders a are connected to provide at least some exhaust flow to the EGR system 104 and/or receive exhaust flow from primary EGR cylinder b during certain operating conditions but are flow isolatable so the primary EGR cylinders b can be completely dedicated EGR cylinders. The term primary EGR, as utilized herein, includes any EGR arrangement wherein, during at least certain operating conditions, the entire exhaust output of certain one or more primary EGR cylinders b is recirculated to the engine intake system 106 is a primary EGR cylinder. A primary EGR cylinder typically, at least during primary EGR operation, includes exhaust divided from one or more of the remaining cylinders that are not primary EGR cylinders.

In the system 100, the EGR flow 108 from primary EGR cylinders b is collected in an EGR exhaust manifold 131 and recirculates in an EGR passage 110 to combine with intake flow 112 at a position upstream of an intake manifold 114 of intake system 106. Intake manifold 114 provides a charge flow including the intake flow 112 combined with EGR flow 108. Intake manifold 114 is connected to an intake passage 116 that includes an intake throttle 118 to regulate the charge flow to cylinders a, b. Intake passage 116 may also include a charge air cooler (not shown) to cool the charge flow provided to intake manifold 114. Intake passage 116 also includes a compressor 120 to compress the intake air flow 112 received from an intake air cleaner 124.

The EGR flow 108 may combine with the intake flow 112 at an outlet of a restriction 122 in EGR passage 110 that is, for example, a mixer or any other suitable arrangement. In certain other embodiments, the EGR flow 108 returns to the intake manifold 114 directly. The EGR system 104 may be a low-pressure loop, for example returning to the intake at a position upstream of compressor 120, or a high-pressure loop, for example returning to the intake at a position downstream of compressor 120 and/or at the intake manifold 114. In certain embodiments, the system 100 does not include a compressor or any other type of boost pressure generating device. The EGR system 104 may include an EGR cooler (not shown) in the EGR passage 110. In other embodiments, EGR passage 110 can include a bypass with a valve that selectively allows EGR flow to bypass the EGR cooler. The presence of an EGR cooler and/or an EGR cooler bypass is optional and non-limiting.

Non-primary EGR cylinders a are connected to an exhaust system 126 that includes an exhaust manifold 130 that receives exhaust gases from non-primary EGR cylinders a, an exhaust passage 132 that receives exhaust gas from exhaust manifold 130, a turbine 128 in exhaust passage 132 that is operable via the exhaust gases to drive compressor 120 via shaft 134, and an aftertreatment system 136 in exhaust passage 132 that is configured to treat emissions in the exhaust gas. Turbine 128 can be a variable geometry turbine with an adjustable inlet, or include a wastegate to bypass exhaust flow. Other embodiments contemplate an exhaust throttle (not shown) in the exhaust system 126.

Figure 2:
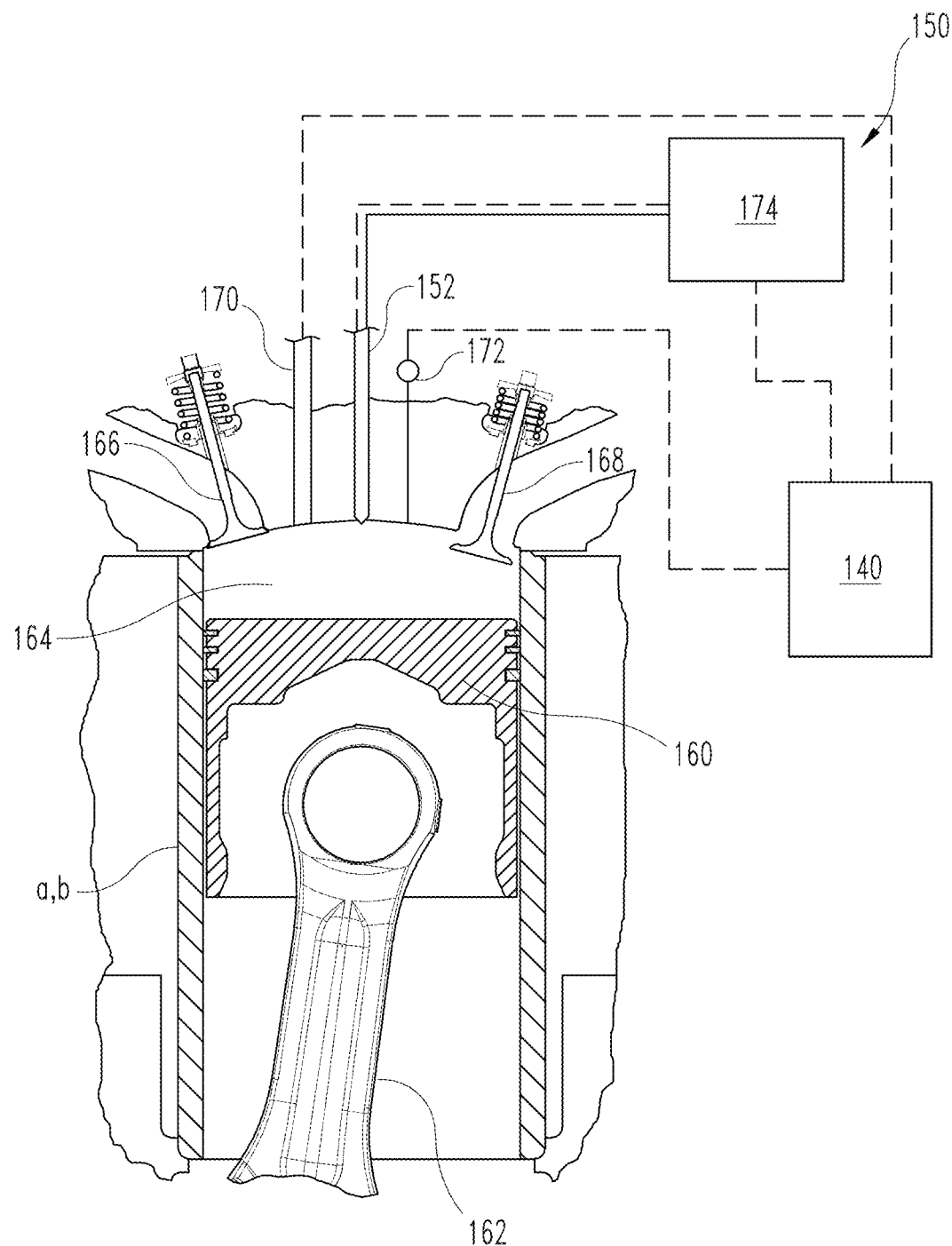
FIG. 2 is a schematic depiction of one embodiment of a cylinder of the internal combustion engine of FIG. 1.

Referring further to FIG. 2, system 100 further includes a fueling system 150 connected to each of the cylinders a, b. In certain embodiments, each of the primary EGR cylinders b includes a direct injector 152 for providing fuel from fueling system 150. A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally. In certain embodiments, the direct injector 152 may be structured to inject fuel into a combustion pre-chamber, although in certain embodiments the primary EGR cylinders b do not include a combustion pre-chamber. Each primary EGR cylinder b may include one or more direct injectors. The direct injectors may be the primary or the only fueling device for the primary EGR cylinders b, or alternatively the direct injectors may be an auxiliary or secondary fueling device for the primary EGR cylinders b. In certain embodiments, the direct injectors are capable of providing all the designed fueling amount for the primary EGR cylinders b at any operating condition. Alternatively, the direct injectors may be only partially capable of providing the designed fueling amount, for example the direct injectors may be capable of providing a designated amount of fuel for a specific purpose, including any purpose described anywhere throughout the present disclosure.

In still other embodiments, primary EGR cylinders b and/or secondary cylinders a include a port injector (not shown) in addition to or alternatively to direct injectors 152. In these embodiments, the port fuel injectors may be positioned such that no other cylinder in the system 100 is downstream of the port fuel injector, i.e. only the target cylinder is downstream of the port fuel injector.

As shown further in FIG. 2, cylinders a, b each include a piston 160 connected to a crank 162. Piston 160 moves in combustion chamber 164 between a top dead center (TDC) position and a bottom dead center (BDC) position. Cylinder a, b includes at least one exhaust valve 166 and at least one intake valve 168 that are operable to selectively open and close an exhaust port and intake port, respectively, in fluid communication with combustion chamber 164. A direct injector 152 is also shown for directing fuel from fuel source 174 directly into combustion chamber 164 in a predetermined pulse amount, width, duration, timing and number of pulses in response to a fueling command from a controller 140. Cylinder a, b also includes a spark plug 170 that ignites the air/fuel mixture in combustion chamber 164 according a spark timing command that times ignition relative the position of piston 160 in combustion chamber 164. In one embodiment, a lambda sensor 172 is connected to or associated with primary EGR cylinder b and configured to provide a real or virtual measurement indicative of the air-fuel ratio, or lambda, within the primary EGR cylinder b to controller 140. Direct injector 152, spark plug 170, and/or lambda sensor 172 can be connected to controller 140 to provide outputs to controller 140 and/or to receive commands from controller 140. In one embodiment, a change in the air-fuel ratio in the primary EGR cylinder(s) b is employed in response to an EGR fraction reduction condition to improve efficiency when the EGR fraction returns to nominal.

In certain embodiments, the controller 140 controls operation of the direct injectors 152 (or port injectors) of primary EGR cylinder(s) b in response to determining EGR fraction reduction conditions are present to output a fueling command that increases the fueling to and therefore the richness of primary EGR cylinder(s) b. The increased richness of the primary EGR cylinder(s) b provides increased reformed fuel products to the charge flow during the reduced EGR fraction condition to prevent or reduce knock in response to the subsequent accelerator tip-in conditions.

In certain embodiments, the system 100 includes a controller 140 structured to perform certain operations to control a divided exhaust gas engine such as engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or by instructions encoded on computer readable medium. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system performance, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Certain systems are described following, and include examples of controller operations in various contexts of the present disclosure. It should be understood that other embodiments contemplate performance of procedure with fewer steps than shown in FIG. 3, with other steps, and/or with steps performed in a different order.

Figure 3:
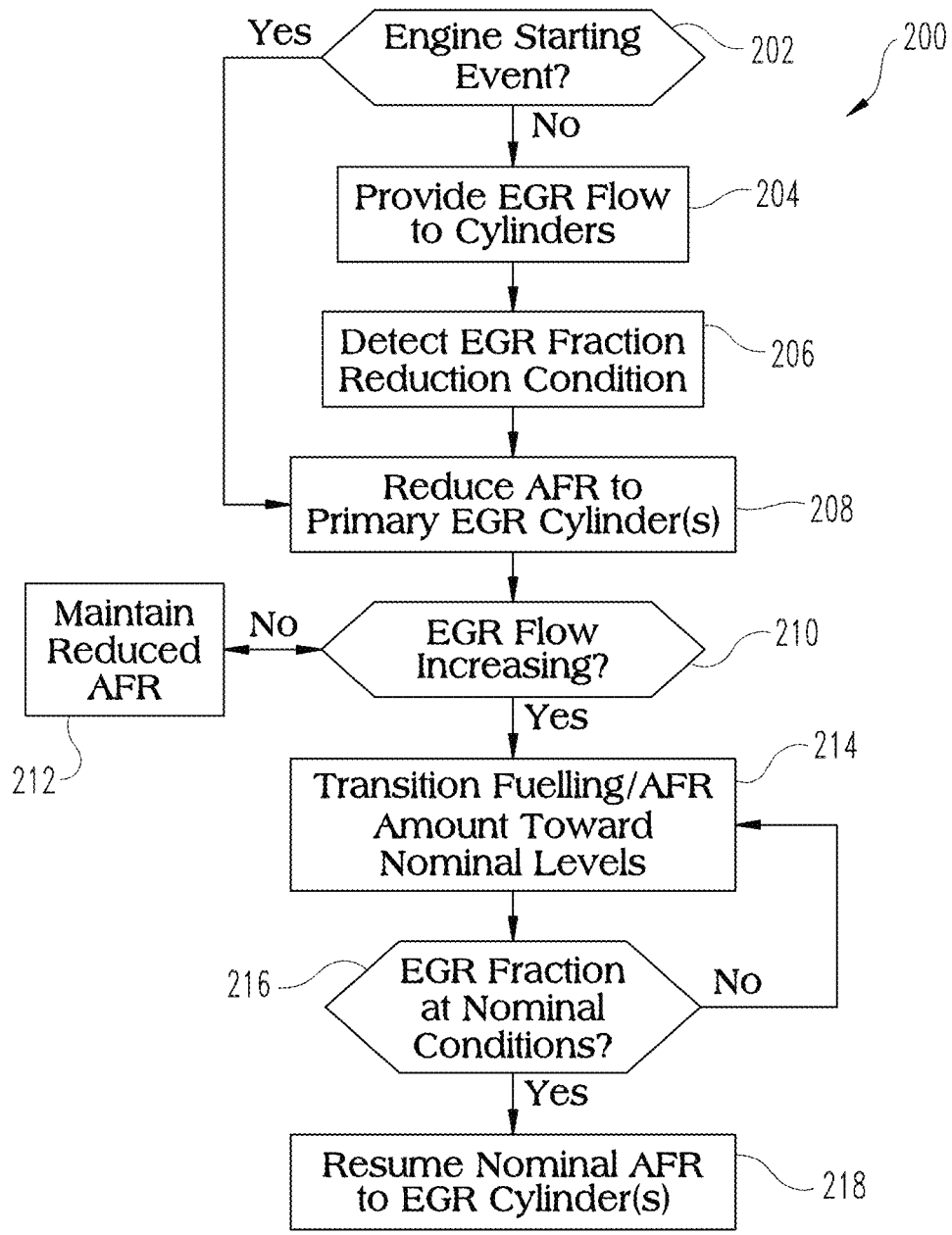
FIG. 3 is a flow diagram of one embodiment of a procedure to mitigate an EGR fraction reduction condition.
Figure 4:
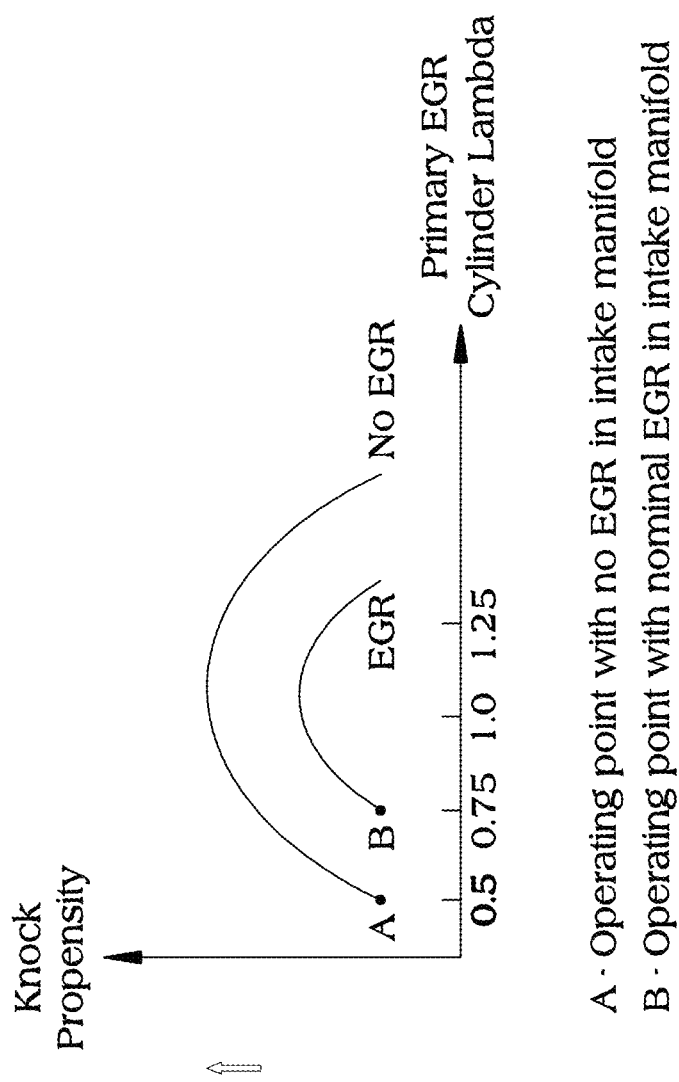
FIG. 4 is a graphical illustration of possible air-fuel ratios in the primary EGR cylinder(s) in response to nominal EGR fraction conditions and reduced EGR fraction conditions.

In certain embodiments, such as procedure 200 shown in FIG. 3, an operation 202 is provided to determine an engine starting or cranking event. If the engine 102 is cranking, then procedure 200 continues at operation 208 to provide a primary EGR cylinder fueling command to reduce the air-fuel ratio to the primary EGR cylinder(s) b, increasing the richness and reducing the lambda in the primary EGR cylinder(s) b. As shown in FIG. 4, the reduced AFR can be provided to the primary EGR cylinder(s) b to decrease the lambda since there is a reduced amount of, or no, recirculated exhaust gas in the primary EGR cylinder(s) b during the EGR fraction reduction condition created by the engine cranking. This increased fuel in the exhaust gas is then recirculated to cylinders a, b with the fresh air flow recirculated from the primary EGR cylinder(s) b. The reformed fuel product in the charge flow is therefore increased and available to mitigate knock conditions in response to the engine starting being complete and/or accelerator tip-in conditions that create EGR flow or increase the EGR flow from its reduced amount.

If the engine is started, procedure 200 continues at operation 204 in which an EGR flow 108 is provided to the intake system 106 to mix with the intake flow, providing a charge flow to cylinders a, b that includes an amount of recirculated exhaust gas that includes all or a portion of the EGR flow 108. The controller 140 is further operable to interpret or determine an EGR fraction reduction condition from a deviation between the actual EGR fraction provided by the amount of recirculated exhaust gas and an expected EGR fraction, such as at operation 206. Controller 140 is further operable to reduce the AFR to the primary EGR cylinder(s) in response to the EGR fraction reduction condition, such as at operation 208 discussed above.

In response to the EGR fraction reduction condition and the reduced AFR, the controller 140 is operable to determine if the EGR flow is increasing at conditional 210. If conditional 210 is negative, procedure 200 maintains the reduced AFR at operation 212, and continues to monitor EGR flow until conditional 210 is positive. In response to conditional 210 being positive, controller 140 is operable to transition the reduced AFR toward a nominal AFR and/or fueling amount that is provided when the EGR flow corresponds to the nominal EGR fraction, such as at operation 214. Operation 214 can include providing multiple fueling commands to transition the fueling of the primary EGR cylinder(s) b from a non-EGR AFR that is based upon detection of the EGR fraction reduction condition indicating no EGR flow to an EGR AFR corresponding to steady state engine operating conditions The procedure 200 continues at conditional 216 to monitor whether the EGR fraction has resumed at nominal conditions. If conditional 216 is negative, procedure 200 returns to operation 214. If conditional 216 is positive, procedure 200 continues at operation 218 to resume nominal fueling to the EGR cylinders.

In another embodiment of procedure 200, an accelerator tip-out condition is detected that indicates an EGR fraction that will be greater than the expected EGR fraction. In response, the controller increases the AFR of the EGR cylinders to improve COV and engine stability.

The EGR fraction reduction condition discussed herein includes any condition that may indicate that the amount of recirculated exhaust gas provided by the EGR flow is terminated, deviates, or is expected to fall significantly below the expected EGR fraction. In one embodiment, the expected EGR fraction indicates that portion of the total exhaust flow that is expected to be provided as recirculated exhaust gas in the charge flow by the primary EGR cylinders b under steady state conditions with all cylinders a, b operating in the same manner and without recirculated exhaust gas flow contribution from non-primary EGR cylinders a. For example, in a 6 cylinder engine with two primary EGR cylinders, the expected EGR fraction in the charge flow is ⅓.

Non-limiting examples of events resulting in EGR fraction reduction conditions include an accelerator tip-out condition, a motoring condition, an accelerator tip-in condition, an engine cranking condition, and a motoring condition followed by an accelerator tip-in condition. An accelerator tip-in condition can result in a reduction of the amount of recirculated exhaust gas due to a temporary starving condition created by the lack of accumulated EGR flow 108 in the EGR system 104. An accelerator tip-out condition and/or motoring condition can result in a reduced or eliminated amount of recirculated exhaust gas due to the engine pumping fresh air flow through cylinders a, b without combustion. An engine cranking condition can also result in a lack of recirculated exhaust gas in the EGR system 104 since combustion has not been initiated.

Controller 140 is operable to interpret an EGR fraction reduction condition in response to determining a reduction in the amount of, or complete lack of, recirculated exhaust gas from the expected EGR fraction, detection of an accelerator tip-in condition, detection of an accelerator tip-out condition, detection of an engine cranking condition, and/or detection of a motoring condition for engine 102, and combinations of these and/or other transient condition indications.

The actual EGR fraction or EGR flow can be determined, for example, by determining the difference between the charge flow at intake manifold 114 and the fresh air intake flow upstream of the mixing location 122; a direct measurement or calculation of EGR flow; a direct measurement or calculation of intake flow upstream of the mixing location of EGR flow 108 and intake flow 112 and the combined charge flow downstream of the mixing location; a measurement of $O_2$ levels in the EGR passage 110 and exhaust manifold 130; a measurement of engine operating conditions from engine sensors 190 indicating the occurrence of likely occurrence of a transient event creating an EGR fraction reduction condition; a determination of accelerator pedal position from accelerator pedal 192; or any suitable EGR flow or EGR fraction determination technique. The charge, intake, and/or EGR flow can be determined by a mass air flow sensor, by calculation using a speed-density approach (charge flow), or any other flow determination technique or device.

Various aspects of the present disclosure are contemplated. For example, according to one aspect a system includes an internal combustion engine having at least one primary EGR cylinder connected to provide an EGR flow to an EGR passage and a plurality of non-primary cylinders connected to provide an exhaust flow to an exhaust passage. The EGR passage is connected to an intake system to provide an EGR flow from the at least one primary EGR cylinder to the intake system. The intake system provides a charge flow to the at least one primary EGR cylinder and the plurality of non-primary cylinders. The charge flow includes an intake air flow and an EGR fraction provided by an amount of recirculated exhaust gas from at least the at least one primary EGR cylinder. The system includes a controller structured to interpret an EGR fraction reduction condition in which the EGR fraction provided by the amount of recirculated exhaust gas in the charge flow is reduced from an expected EGR fraction during steady state conditions, and in response to the EGR fraction reduction condition to reduce an air-fuel ratio in the at least one primary EGR cylinder In one embodiment, the system also includes a fuel system connected by at least one injector to each of the at least one primary EGR cylinder and the plurality of non-primary EGR cylinders. The controller is configured to control the air-fuel ratio by controlling the fueling amount from the at least one injector connected to the at least one primary EGR cylinder.

In another embodiment, the at least one primary EGR cylinder includes at least two primary EGR cylinders. In yet another embodiment, the controller is configured to interpret the EGR fraction reduction condition in response to an accelerator tip-in condition. In a refinement of this embodiment, the EGR fraction reduction condition is interpreted in response to a motoring condition of the internal combustion engine preceding the accelerator tip-in condition.

In a further embodiment, the controller is configured to interpret the EGR fraction reduction condition in response to an engine cranking event. In another embodiment, the controller is configured to an accelerator tip-out condition. In yet another embodiment, the EGR fraction reduction condition includes no recirculated exhaust gas in the intake manifold. In still another embodiment, the controller is configured to transition the air-fuel ratio from a non-EGR fueling amount that is based upon detection of the EGR fraction reduction condition to an EGR fueling amount corresponding to steady state engine operating conditions.

According to another aspect, a method includes: providing a charge flow to an internal combustion engine having at least one primary EGR cylinder connected to an EGR passage and a plurality of non-primary EGR cylinders connected to an exhaust passage; passing an exhaust flow from the non-primary EGR cylinders through the exhaust passage; passing an EGR flow from the at least one primary EGR cylinder through the EGR passage to an intake system, the charge flow including an EGR fraction corresponding to an amount of recirculated exhaust gas in the charge flow from at least the at least one primary EGR cylinder; determining an EGR fraction reduction condition in the charge flow to the internal combustion in engine in response to a reduction of the EGR fraction from an expected EGR fraction; and in response to determining the EGR fraction reduction condition, reducing an air-fuel ratio to the at least one primary EGR cylinder.

In one embodiment of the method, adjusting the recirculated amount of exhaust gas includes reducing the air-fuel ratio to the at least one primary EGR cylinder as the EGR fraction increased from the EGR fraction reduction condition. In another embodiment of the method, determining the EGR fraction reduction condition includes detecting an accelerator tip-in condition following a motoring event for the engine.

In yet another embodiment of the method, determining the EGR fraction reduction condition includes detecting an engine cranking event. In still another embodiment, determining the EGR fraction reduction condition includes detecting an accelerator tip-out condition.

According to another aspect, an apparatus includes a controller configured to interpret an EGR fraction reduction condition in which an EGR fraction provided by an amount of recirculated exhaust gas in a charge flow to a plurality of cylinders of an internal combustion engine is reduced from an expected steady state EGR fraction. In response to the EGR fraction reduction condition, the controller is configured to reduce an air-fuel ratio in the at least one dedicated EGR cylinder According to another aspect, a system includes an internal combustion engine having at least one primary EGR cylinder connected to provide an EGR flow to an EGR passage and a plurality of non-primary cylinders connected to provide an exhaust flow to an exhaust passage. The EGR passage is connected to an intake system to provide an EGR flow from the at least one primary EGR cylinder to the intake system. The intake system Provides a charge flow to the at least one primary EGR cylinder and the plurality of non-primary cylinders, and the charge flow includes an intake air flow and an EGR fraction provided by an amount of recirculated exhaust gas from at least the at least one primary EGR cylinder. The system also includes a controller configured to interpret an EGR fraction increase condition in which the EGR fraction provided by the amount of recirculated exhaust gas in the charge flow is increased from an expected EGR fraction during steady state conditions. In response to the EGR fraction increase condition the controller increases an air-fuel ratio in the at least one primary EGR cylinder.

In another embodiment, the system includes a fuel system connected by at least one injector to each of the at least one primary EGR cylinder and the plurality of non-primary EGR cylinders. The controller is configured to decrease the fueling amount from the at least one injector connected to the at least one primary EGR cylinder by an amount that increases the air fuel ratio relative to the steady state air fuel ratio target. In a further embodiment, the at least one primary EGR cylinder includes at least two primary EGR cylinders. In yet another embodiment, the controller is configured to interpret the EGR fraction reduction condition in response to an accelerator tip-out condition.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
an internal combustion engine having at least one primary exhaust gas recirculation (EGR) cylinder connected to provide an EGR flow to an EGR passage and a plurality of non-primary cylinders connected to provide an exhaust flow to an exhaust passage, wherein the EGR passage is connected to an intake system to provide an EGR flow from the at least one primary EGR cylinder to the intake system, wherein the intake system provides a charge flow to the at least one primary EGR cylinder and the plurality of non-primary cylinders, the charge flow including an intake air flow and an EGR fraction provided by an amount of recirculated exhaust gas from at least the at least one primary EGR cylinder; and
a controller configured to interpret an EGR fraction reduction condition in which the EGR fraction provided by the amount of recirculated exhaust gas in the charge flow is reduced from an expected EGR fraction during steady state conditions, and in response to the EGR fraction reduction condition the controller is configured to reduce an air-fuel ratio in the at least one primary EGR cylinder.

2. The system of claim 1, further comprising a fuel system connected by at least one injector to each of the at least one primary EGR cylinder and the plurality of non-primary EGR cylinders, wherein the controller is configured to increase the fueling amount from the at least one injector connected to the at least one primary EGR cylinder by an amount that reduces the air-fuel ratio relative to a steady state air-fuel ratio.

3. The system of claim 1, wherein the at least one primary EGR cylinder includes at least two primary EGR cylinders.

4. The system of claim 1, wherein the controller is configured to interpret the EGR fraction reduction condition in response to an accelerator tip-in condition.

5. The system of claim 4, wherein the EGR fraction reduction condition is interpreted in response to a motoring condition of the internal combustion engine preceding the accelerator tip-in condition.

6. The system of claim 1, wherein the controller is configured to interpret the EGR fraction reduction condition in response to an engine cranking event.

7. The system of claim 1, wherein the controller is configured to interpret the EGR fraction reduction condition in response to an accelerator tip-out condition.

8. The system of claim 1, wherein the EGR fraction reduction condition is a condition in which there is no recirculated exhaust gas in the intake manifold.

9. The system of claim 1, wherein the controller is configured to transition the air-fuel ratio from a non-EGR fueling amount that is based upon detection of the EGR fraction reduction condition to an EGR fueling amount corresponding to steady state engine operating conditions.

10. A method comprising:
providing a charge flow to an internal combustion engine having at least one primary exhaust gas recirculation (EGR) cylinder connected to an EGR passage and a plurality of non-primary EGR cylinders connected to an exhaust passage;
passing an exhaust flow from the non-primary EGR cylinders through the exhaust passage;
passing an EGR flow from the at least one primary EGR cylinder through the EGR passage to an intake system, the charge flow including an EGR fraction corresponding to an amount of recirculated exhaust gas in the charge flow from at least the at least one primary EGR cylinder;
determining an EGR fraction reduction condition in the charge flow to the internal combustion engine in response to a reduction of the EGR fraction from an expected EGR fraction; and
in response to the EGR fraction reduction condition, reducing an air-fuel ratio to the at least one primary EGR cylinder.

11. The method of claim 10, wherein adjusting the recirculated amount of exhaust gas includes reducing the air-fuel ratio to the at least one primary EGR cylinder as the EGR fraction increases from the EGR fraction reduction condition.

12. The method of claim 10, wherein determining the EGR fraction reduction condition includes detecting an accelerator tip-in condition following a motoring event for the engine.

13. The method of claim 10, wherein determining the EGR fraction reduction condition includes detecting an engine cranking event.

14. The method of claim 10, wherein determining the EGR fraction reduction condition includes detecting an accelerator tip-out condition.

15. An apparatus for controlling operation of an internal combustion engine, comprising a controller configured to:
   interpret an exhaust gas recirculation (EGR) fraction reduction condition in which an EGR fraction provided by an amount of recirculated exhaust gas in a charge flow to a plurality of cylinders of the internal combustion engine is reduced from an expected steady state EGR fraction; and
   in response to the EGR fraction reduction condition, reduce an air-fuel ratio in the at least one dedicated EGR cylinder.

16. The apparatus of claim 15, wherein the controller is configured to interpret the EGR fraction reduction condition in response to at least one of:
   an accelerator tip-in condition following a motoring event for the internal combustion engine;
   an engine cranking event for the internal combustion engine; and
   an accelerator tip-out condition for the internal combustion engine.

17. A system comprising:
   an internal combustion engine having at least one primary exhaust gas recirculation (EGR) cylinder connected to provide an EGR flow to an EGR passage and a plurality of non-primary cylinders connected to provide an exhaust flow to an exhaust passage, wherein the EGR passage is connected to an intake system to provide an EGR flow from the at least one primary EGR cylinder to the intake system, wherein the intake system provides a charge flow to the at least one primary EGR cylinder and the plurality of non-primary cylinders, the charge flow including an intake air flow and an EGR fraction provided by an amount of recirculated exhaust gas from at least the at least one primary EGR cylinder; and
   a controller configured to interpret an EGR fraction increase condition in which the EGR fraction provided by the amount of recirculated exhaust gas in the charge flow is increased from an expected EGR fraction during steady state conditions, and in response to the EGR fraction increase condition to increase an air-fuel ratio in the at least one primary EGR cylinder.

18. The system of claim 17, further comprising a fuel system connected by at least one injector to each of the at least one primary EGR cylinder and the plurality of non-primary EGR cylinders, wherein the controller is configured to decrease the fueling amount from the at least one injector connected to the at least one primary EGR cylinder by an amount that increases the air fuel ratio relative to the steady state air fuel ratio target.

19. The system of claim 17, wherein the at least one primary EGR cylinder includes at least two primary EGR cylinders.

20. The system of claim 17, wherein the controller is configured to interpret the EGR fraction reduction condition in response to an accelerator tip-out condition.

* * * * *